Sept. 16, 1930. J. R. BALSLEY 1,776,058
SOUND RECORD FILM AND APPARATUS
Filed Dec. 5, 1928
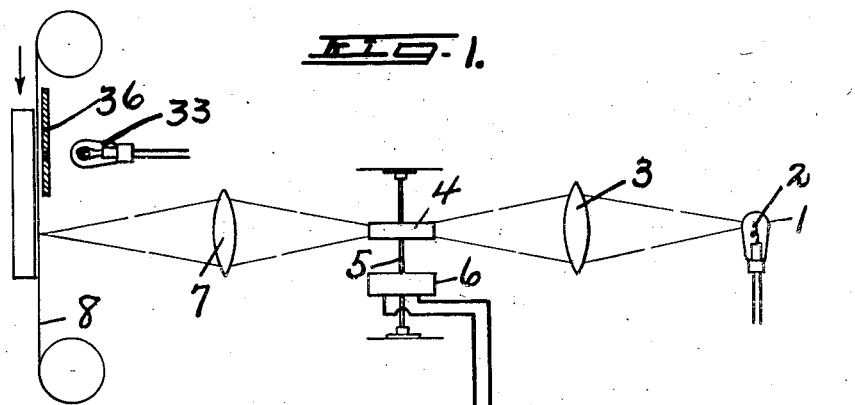
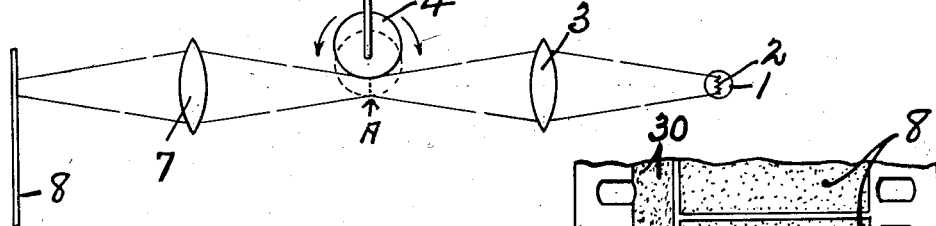
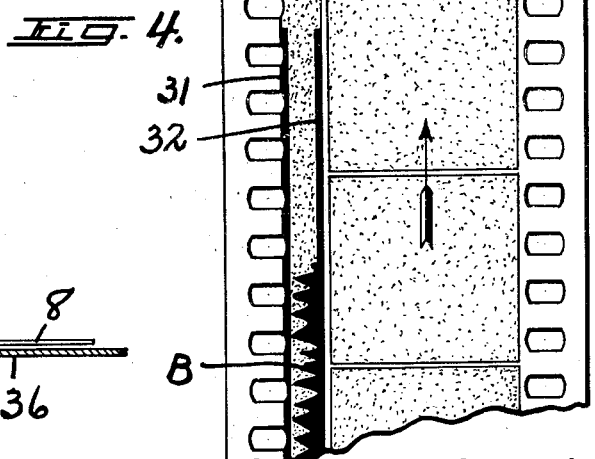

Patented Sept. 16, 1930

1,776,058

UNITED STATES PATENT OFFICE

JAMES R. BALSLEY, OF NEW YORK, N. Y., ASSIGNOR TO FOX CASE CORPORATION, OF NEW YORK, N. Y., A CORPORATION OF NEW YORK

SOUND-RECORD FILM AND APPARATUS

Application filed December 5, 1928. Serial No. 324,019.

This invention relates to certain new and useful improvements in sound record films and the apparatus for producing the same and relates particularly to a film having a photographic sound record of the variable area or serrated edge type.

In the reproduction of such records it is common to focus an extremely narrow line of light upon the sound record, or to interpose a member having a slit in front of the sound record, the slit being of a size to permit the passage of a line of light substantially equal in size to the line of light utilized in producing the sound record. And it is found in the reproduction of variable area records that any slight side motion of the film that may occur in the reproducing apparatus, due to imperfections in the film or apparatus, causes the production of the undesirable sounds, and the object of this invention is to eliminate this defect in the reproduction of such records.

Other objects and advantages relate to the details of the structure and the form and relation of the parts thereof, all as will more fully appear from the following description, taken in connection with the accompanying drawings, in which:—

Figure 1 is a diagrammatic illustration of an apparatus for carrying out this invention.

Figure 2 is a diagrammatic illustration taken at right angles to Figure 1 omitting the modulated circuit.

Figure 3 is a section through the gate or slotted wall of the camera.

Figure 4 is a view of a portion of a film, the sound record portion of which has been produced in accordance with this invention.

In Figures 1 and 2 a special form of apparatus is illustrated for producing a variable area sound record, but such apparatus is merely illustrative of a way of producing such a record and any other suitable apparatus may be substituted, as the method of producing a variable area record forms no portion of this invention. However, the apparatus here disclosed operates upon the principle of projecting on a moving film a straight line of light, the length of which is varied in a manner hereinafter described, and the source of which may be a straight line filament lamp, as disclosed in Figures 1 and 2, or may be the focussed image of an illuminated slit.

As illustrated in Figures 1 and 2, the source of light is an electric lamp —1— having a straight line filament —2—, the image of which is focussed by a lens or lens system —3— in air at dotted line A, Figure 2. The straight line filament may be the same size as the focussed line of light, or may be larger or smaller, and may be enlarged or reduced, as desired, by suitable lens system. A shutter —4— of suitable form and shape is provided in the same plane as the focussed line of light and having its axis of movement or rotation intersecting line A extended. The shutter —4— is eccentrically mounted upon the oscillatory shaft —5— of a galvanometer —6—. This galvanometer is connected in circuit with a microphone —27— through any number of stages of amplification desired for amplifying the sound modulated current so that it will effectively actuate the galvanometer —6—.

The shutter —4— as here shown is a circular disk eccentrically mounted upon shaft —5—, but various forms of disks or members may be utilized in accordance with the particular requirements of the system.

As will be well understood, the shutter —4— is rotated in both directions, or oscillated from a normal position by means of the galvanometer, which latter structure is actuated by an electric current modulated in accordance with sound waves. The light of the focussed image at A may in turn be focussed by a lens or lens system —7— upon a film or sensitized element —8—.

If desired, an opaque member having a narrow elongated slit may be interposed between the lens system and the film with the film in substantial contact with said member, but such a member is not required if a suitable image is produced or a suitable lens system utilized for reducing or enlarging the size of the image to that desired in exposure of the film. Rotation of shutter —4— by galvanometer —6— from a pre-determined position will cause the shutter to interrupt more or less of the focussed line of light at A and prevent its passage to lens system —7— and film —8— and consequently the image on the film will be varied in width in accordance with the rotation or oscillation of shutter —4—.

Complete modulation will be obtained when the length of the line A will be varied between zero and the complete length of the image. In Figure 2 the shutter —4— is shown in dotted lines in such a position as to interrupt the entire length of the line A and the greatest length of the focussed line of light A will be determined by the shortest radius from the axis to the periphery of the shutter —4—, such position being shown in full lines, Figure 2.

By properly shaping the shutter in accordance with particular requirements of a special system, it is possible to obtain complete modulation by any angular swing or rotary movement of the galvanometer from its normal or zero position.

In order to produce a perfect record, the instantaneous values of length of image at line A must correspond exactly at any frequency to the instantaneous value of current generated by the microphone and amplifiers, and thus any inequality of the relation of angular displacement of the galvanometer to current may be compensated for in the shape of the shutter.

The frequency characteristic of the light valve consisting of the galvanometer —6— and its associated shutter —4— will be dependent upon the mass, compliance, stiffness and damping of the component parts. It is preferable to so adjust these elements that the natural period or resonant frequency of the system will be above the highest frequency it is desired to record, governed by amplifier constants, in order to increase the higher frequencies which suffer a loss in printing and projection.

It will be apparent that the record produced upon the film —8— will vary in width in accordance with the movement of the shutter —4— to cut off more or less of the focussed light image at A and such a record is illustrated at B, Figure 4. In the reproduction of such a record, as shown at B, Figure 4, it is found that slight side motion of the film occurring in the reproducing apparatus, due to imperfections in either the film or the apparatus, causes the production of undesirable noise, and I have discovered that this defect can be eliminated by providing a substantially opaque border at opposite sides of the sound record, or at the opposite edges of the sound track marked —30— in the drawings.

These substantially opaque borders at opposite edges of the sound track —30— may be produced in any suitable way, and should be produced upon the film, whether negative or positive, that is to be used for actually reproducing the original sounds. The negative may itself constitute the record used for reproduction but usually the negative is retained for the purpose of producing numerous positives, and in such case the opaque strips or borders at opposite edges of the sound track and upon opposite sides of the sound record should be produced upon the positive. Therefore, in the claims of this application the term "photographic sound record" is deemed to include either the negative or the positive produced therefrom, as either is capable of use for reproducing the original sounds.

The opaque strips at opposite edges of the sound track are illustrated in Figure 4 at —31— and —32— and these may be produced upon the negative in any suitable manner, as for instance by exposing these portions of the film to a steady constant light so that when developed these strips at opposite edges of the sound track will be substantially opaque to the passage of sound rays.

In Figures 1 and 3 an apparatus is illustrated by means of which the exposure of these strips upon the film may be effected. At any point during the movement of the film in the taking of the sound record, the strips —31— and —32— may be exposed to a steady constant light, and as here illustrated the opaque wall —36— is provided with a pair of spaced slots or openings of a width equal to the desired width of the strips —31— and —32— and spaced apart a distance equal at least to the width of the sound record to be produced.

These slots are shown as positioned some distance in front of the point where the line of light is focussed upon the film for producing the variable area sound record. Any suitable means may be provided for effecting the desired exposure, as for instance an electric lamp —33— constituting a steady, uniform source of light, the rays of which may pass through the spaced slots —34— and —35— to produce the exposed strips —31— and —32— respectively at opposite edges of the sound track —30—.

When a negative so produced is developed, the sound record will have upon its opposite sides borders, or strips, substantially opaque to the passage of light rays.

On the other hand, if Figure 4 is the positive film, the opaque borders at opposite edges of the sound record may be produced by printing from a negative in which the strips —31— and —32— are substantially transparent and have been unexposed to light rays. Upon printing such a negative, the positive will have the substantially opaque strips —31— and —32—. Obviously, if the sound record B is produced by means of a line of light of less width than the sound track —30—, there will be unexposed opaque strips at opposite edges of such a sound record and upon printing of such a negative, the resultant positive will have the opaque borders or strips —31— and —32— which will act to prevent the production of undesirable noise even if the film should move laterally somewhat in the projecting or reproducing apparatus.

The film record disclosed in Figure 4 comprises opaque strips or borders upon opposite sides of the sound record, but it will be apparent that considerable advantage will be obtained by the provision of a strip or border substantially opaque to the passage of light rays upon one side of such a sound record, and my invention, therefore, contemplates either substantially opaque strips or borders upon both sides of the sound record, or a single opaque border or strip upon either side of the sound record.

And altho I have shown and described a specific apparatus as illustrative of a means for producing a variable area record and for producing the desired substantially opaque strips upon opposite sides of such record, it will be obvious that my apparatus may be utilized for the production of the variable area record, and that various means may be provided for rendering the strips —31— and —32— substantially opaque to the passage of light rays, and I do not desire to restrict myself to any particular apparatus or any particular means for producing the structure of this invention, as various changes and modifications may be made within the scope of the appended claims.

I claim:

1. A film including a record of light variations corresponding to sound wave variations, and substantially opaque straight edge borders upon opposite sides of said sound record.

2. A film including a record of light variations corresponding to sound wave variations, and narrow strips substantially opaque to the passage of light rays disposed upon opposite sides of the sound record.

3. A film including a variable area record of light variations corresponding to sound wave variations, and substantially opaque straight edge borders upon opposite sides of said record.

4. A film including a record of light wave variations corresponding to sound wave variations and a substantially opaque straight edge border at one side of the sound record.

5. A film including a variable area record of light variations corresponding to sound wave variations, and a substantially opaque straight edge border strip at one side of the sound record.

6. A film including a sound track, a record of light wave variations corresponding to sound wave variations upon the central portion of said track and substantially opaque straight edge strips at the opposite edges of said sound track and upon opposite sides of said sound record.

7. A film including a sound track, a record of light wave variations corresponding to sound wave variations upon the central portion of said track and substantially opaque straight edge strips of substantial constant density at the opposite edges of said sound track and upon opposite sides of said sound record.

In witness whereof I have hereunto set my hand this 13th day of November, 1928.

JAMES R. BALSLEY.